United States Patent [19]

Tanaka

[11] Patent Number: 4,851,727
[45] Date of Patent: Jul. 25, 1989

[54] PERMANENT MAGNET TYPE ELECTRIC MOTOR

[75] Inventor: Toshinori Tanaka, Hyogo, Japan

[73] Assignee: Mitsubishi Denki Kabushiki Kaisha, Tokyo, Japan

[21] Appl. No.: 33,949

[22] Filed: Apr. 3, 1987

[30] Foreign Application Priority Data

Apr. 9, 1986 [JP] Japan ............................ 61-53037[U]

[51] Int. Cl.⁴ ............................................ H02K 21/26
[52] U.S. Cl. ............................ 310/154; 310/40 MM; 310/254
[58] Field of Search ............... 310/154, 42, 218, 258, 310/40 MM

[56] References Cited

U.S. PATENT DOCUMENTS

| | | | |
|---|---|---|---|
| 3,594,599 | 7/1971 | West | 310/154 X |
| 3,772,546 | 11/1973 | Means | 310/154 |
| 3,988,623 | 10/1976 | Yamaguchi et al. | 310/40 MM X |
| 4,155,021 | 5/1979 | Corbach | 310/154 |
| 4,335,323 | 6/1982 | Kebbon | 310/40 MM |
| 4,580,072 | 4/1986 | Morishita | 310/154 |
| 4,665,333 | 5/1987 | Heim | 310/154 |

FOREIGN PATENT DOCUMENTS

| | | | |
|---|---|---|---|
| 0134458 | 3/1985 | European Pat. Off. | 310/254 |
| 2735778 | 3/1979 | Fed. Rep. of Germany | 310/40 MM |
| 2013414 | 8/1979 | United Kingdom | 310/40 MM |

Primary Examiner—Mark O. Budd
Attorney, Agent, or Firm—Sughrue, Mion, Zinn, Macpeak and Seas

[57] ABSTRACT

A permanent magnet type electric motor has stoppers for restricting axial movement of field magnetic poles each composed of a permanent magnet and an auxiliary pole 13 in a cylindrical yoke thereof. The stoppers may be protrusions 17 arranged in the yoke or may be a ring member 21 resiliently fitted in the yoke. The auxiliary poles 15 are welded to an inner wall of the yoke 11 and the magnets 14 may be bonded thereto by a suitable adhesive so that enough space to receive a through-bolt is provided between adjacent ones of the field magnetic poles.

2 Claims, 1 Drawing Sheet

4,851,727

PERMANENT MAGNET TYPE ELECTRIC MOTOR

BACKGROUND OF THE INVENTION

The present invention relates to a permanent magnet type electric motor and, particularly, to a structure thereof suitable for a smooth arrangement of through-bolts between field magnetic poles mounted on an inner surface of a cylindrical yoke of the motor.

FIGS. 1 and 2 show a conventional d.c. motor of this type, in which the motor is composed of a cylindrical yoke 1 on an inner peripheral surface of which a plurality of field magnetic poles 4 each composed of a permanent magnet 2 and an auxiliary pole 3 are arranged in parallel with a space 5 between adjacent ones thereof.

A generally U-shaped leaf spring 6 is inserted into each space 5 to urge the field magnetic poles peripherally outwardly so that the magnetic poles 4 are in pressure-contact with the inner peripheral surface of the cylindrical yoke 1 to thereby fix the magnetic poles 4 to the cylindrical yoke 1.

The leaf spring 6 has an axial end portion protruding from the space 5 and side wall portions 6a and 6b of the end portion are opened slightly as shown in FIG. 2 to restrict axial movement of the field magnetic poles 4.

In the structure shown in FIG. 1, four field magnetic poles 4 are used to provide four spaces 5 in two of which through-bolts 7 are provided axially. An armature 8 is rotatably supported within a region defined by the field magnetic poles 4.

In such structure as mentioned above, when the thickness of the field magnetic pole 4 is small and hence the height of the side walls of the spring is small, the stability of the spring in the space is low necessarily, causing an assembling operation of the motor to become difficult, or, when an outer diameter of the cylindrical yoke 1 is small and it is impossible to make the pitch of the through-bolt smaller, the space for the through-bolt becomes insufficient.

SUMMARY OF THE INVENTION

An object of the present invention is to provide a permanent magnet type electric motor in which an assembling operation thereof is facilitated with enough spaces for the through-bolts even if the thickness of the field magnetic pole is not enough and/or even if the outer diameter of the cylindrical yoke is small.

The permanent magnet type electric motor according to the present invention comprises a cylindrical yoke, a plurality of field magnetic poles each composed of a permanent magnet and an auxiliary pole of high permeability material arranged in parallel to the magnet, the field magnetic poles being arranged on an inner surface of the cylindrical yoke peripherally with a space between adjacent ones thereof, a stopper engaged with at least one axial end of the field magnetic poles for defining axial positions of the field magnetic poles and at least a pair of through-bolts provided in opposing ones of the spaces provided between adjacent ones of the field magnetic poles. The auxiliary poles are welded to the inner surface of the yoke and the magnets are bonded thereto by a suitable adhesive. Thus, each space between the field magnetic poles is left clear, so that the arrangement of the through-bolts is facilitated.

DETAILED DESCRIPTION OF THE PREFERRED EMBODIMENTS

Figure 3:
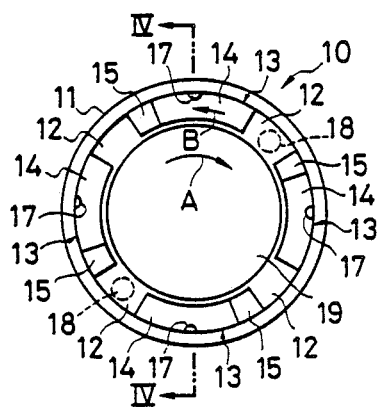
FIG. 3 is a cross section of a magnet type motor according to a first embodiment of the present invention.
Figure 4:
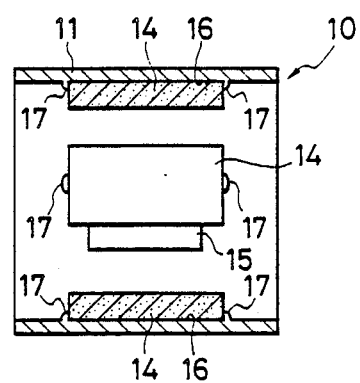
FIG. 4 is a longitudinal cross section taken along a line IV—IV in FIG. 3.

FIGS. 3 and 4 show a first embodiment of the present invention, in cross section and in longitudinal cross section, respectively. In these figures, a magnet type motor 10 comprises a cylindrical yoke 11 and four field magnetic poles 13 are arranged peripherally on an inner surface of the cylindrical yoke 11 equiangularly with a space 12 between adjacent ones of the field magnetic poles 13. Each field magnetic pole 13 is composed of a permanent magnet 14 and an auxiliary pole 15 formed of high permeability material such as soft iron. The magnet 14 is bonded to the inner surface of the cylindrical yoke 11 by a suitable adhesive 16 and the auxiliary pole 15 is disposed in intimate contact with an axial side surface of the magnet 14 and welded to the inner wall of the yoke 11.

As is clearly shown in FIG. 4, a pair of protrusions 17 are formed on the inner wall of the yoke 11 at positions corresponding to respective opposite ends of each magnet 14. The protrusions 17 constitute stoppers for preventing the magnets 14 from moving axially. The protrusions 17 may be formed by embossing the yoke 11 or may be formed by suitably fixing separately prepared stopper members to the inner wall of the cylindrical yoke 11. Further, in some cases, it may be enough to provide a single protrusion at either end of each magnet. A pair of through-bolts 18 are arranged in opposing ones of the spaces 12.

In operation, when an armature core 19 rotates clockwise as shown by arrow A in FIG. 3, the permanent magnet 14 of each field magnetic pole 13 is subjected to a counterclockwise force as shown by arrow B. The counterclockwise force acting on each magnet 14 is received by the associated auxiliary pole 15 welded to the inner wall of the yoke 11. Further, since the magnets 14 are prohibited to move axially by the protrusions 17, the axial positions of the magnets 14 can be stably maintain even if the adhesive 16 used to bond the magnets 14 to the wall of the yoke 11 is degraded. In other words, the external force exerted on the magnets 14 does not affect the adhesive 16.

Figure 5:
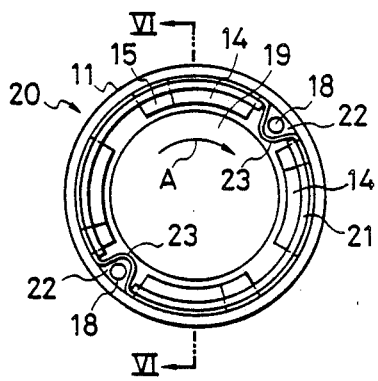
FIG. 5 is a cross section of a second embodiment of the present invention.
Figure 6:
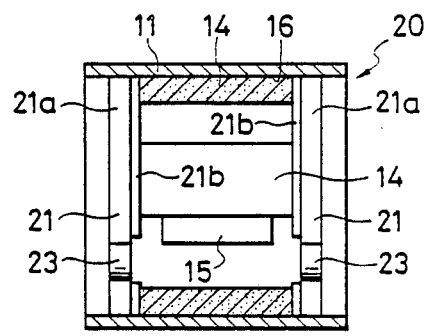
FIG. 6 is a longitudinal cross section taken along a line VI—VI in FIG. 5.

FIG. 5 and 6 show a magnet type motor 20 according to a second embodiment of the present invention, in cross section and in longitudinal cross section, respectively. In these figures, the same reference numerals as those used in the first embodiment in FIGS. 3 and 4 depict the same or corresponding to those shown in FIGS. 3 and 4, respectively.

In the motor 20, the stopper comprises, instead of the protrusions 17 in FIGS. 3 and 4, a pair of resilient ring members 21 resiliently fitted in the cylindrical yoke 11 at the opposite ends of the magnets 14. Each ring member 21 comprises a ring portion 21a having a flat outer surface to be in planar contact with the inner wall of the cylindrical yoke 11. The ring portion 21a is bent inwardly at diagonally opposite positions thereof to form bent portions 23 to thereby define spaces 22 between the bent portions 23 and the inner wall of the cylindrical yoke 11.

Inwardly protruding flanges 21b are for formed integrally with all of the axially inner edge of the ring portions 21a expect the bent portions 23. The positions of the bent portions 23, when the ring members 21 are fitted in the yoke 11, correspond to opposing ones of the spaces 12, respectively. Through-bolts 18 are inserted into the spaces 22, respectively.

The ring members 21 are resiliently fitted in the yoke 11 with the flat surfaces of the ring portions 21a thereof being in pressure-contact with the inner wall of the cylindrical yoke 11 and the flanges 21b restrict the axial movement of the magnets 14.

In the second embodiment, the ring members 21 are formed of spring steel. However, they may be formed of soft steel. In the latter case, the ring members 21 may be welded to the inner wall of the yoke 11.

The magnets 14 may be fixed to the inner wall of the yoke 11 by their own magnetism instead of the adhesive 16.

Figure 1:
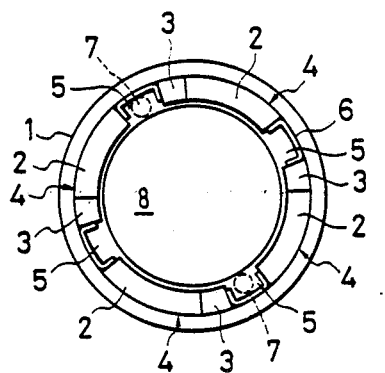
FIG. 1 is a cross section of a conventional magnet type motor.
Figure 2:
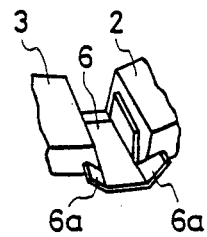
FIG. 2 is a perspective view of a field magnetic poles of the conventional motor in FIG. 1, showing an assembling thereof.

As mentioned hereinbefore, according to the present invention, the field magnetic poles are fixed to the inner wall of the cylindrical yoke with the magnets being bonded thereto and the auxiliary poles being welded thereto and are prevented from moving axially by means of stopers. Thus, the spaces between the field magnetic poles can be sufficient to pass the through-bolts even if the thickness of the field magnetic pole and/or the outer diameter is small while it is impossible to make the pitch of the through-bolt smaller. Since, in the present invention, leaf springs such as shown in FIG. 1 are unnecessary, the assembly of the motor is facilitated with effects of weight reduction and cost reduction of the motor.

What is claimed is:

1. A permanent magnet type electric motor, comprising: a cylindrical yoke (11), a plurality of arcuate field magnet poles (13) arranged on an inner peripheral surface of said cylindrical yoke such that a plurality of open spaces (12) individually remain between adjacent circumferential ends of said poles, a plurality of stop members (17; 21) extending radially inwardly from the inner peripheral surface of the yoke and directly engaging opposite axial ends of each field magnet pole to axially position and restrain said poles, and armature core (19) rotatably disposed in a region surrounded by said field magnet poles, each field magnet pole comprising a permanent magnet (14) adhesively bonded to the inner peripheral surface of the yoke, and an auxiliary magnetic pole (15) of high permeability material arranged in parallel with said permanent magnet and welded to said inner peripheral surface of said cylindrical yoke, at least two bolts (18) disposed in and extending through two of said open spaces remaining between adjacent field pole ends, wherein said stop members engage substantially less than full axial end surfaces of said field magnet poles, and wherein said stop members comprise a pair of resilient rings disposed in pressure contact with said inner peripheral surface of said cylindrical yoke, each ring defining at least two radially inwardly bent portions (23) disposed in axial alignment with said two of said open spaces to provide clearance for the passage of said bolts.

2. A permanent magnet type electric motor, comprising: a cylindrical yoke (11), a plurality of arcuate field magnet poles (13) arranged on an inner peripheral surface of said cylindrical yoke such that a plurality of open spaces (12) individually remain between adjacent circumferential ends of said poles, a plurality of stop members (21) extending radially inwardly from the inner peripheral surface of the yoke and directly engaging opposite axial ends of each filed magnet pole to axially position and restrain said poles, an armature core (19) rotatably disposed in a region surrounded by said field magnet poles, each field magnet pole comprising a permanent magnet (14) adhesively bonded to the inner peripheral surface of the yoke and an auxiliary magnetic pole (15) of high permeability material arranged in parallel with said permanent magnet and welded to said inner peripheral surface of said cylindrical yoke, at least two bolts (18) disposed in and extending through two of said open spaces remaining between adjacent field pole ends, wherein said stop members engage substantially less than full axial end surfaces of said field magnet poles, and wherein said stop members comprise a pair of rings welded to said inner peripheral surface of said cylindrical yoke, each ring defining at least two radially inwardly bent portions (23) disposed in axial alignment with said two of said open spaces to provide clearance for the passage of said bolts.

* * * * *